United States Patent [19]

Morgan

[11] Patent Number: 4,475,760
[45] Date of Patent: Oct. 9, 1984

[54] TRUCK BED EXTENSION ATTACHMENT

[76] Inventor: Robert L. Morgan, 15757 Eastwood Rd., Williamsburg, Ohio 45176

[21] Appl. No.: 390,206

[22] Filed: Jun. 21, 1982

[51] Int. Cl.³ .............................................. B62D 33/08
[52] U.S. Cl. ...................................... 296/26; 280/638; 248/430
[58] Field of Search .......................... 296/26; 280/638; 248/430; 108/43

[56] References Cited

U.S. PATENT DOCUMENTS

| | | | |
|---|---|---|---|
| 1,366,771 | 1/1921 | DeVencenzi | 296/26 |
| 2,468,579 | 4/1949 | Vuori | 296/26 |
| 2,712,470 | 7/1955 | Cardini | 296/26 |
| 2,729,499 | 1/1956 | Eggum | 296/26 |
| 2,784,027 | 3/1957 | Temp | 296/23 |
| 2,852,303 | 9/1958 | Hopson | 296/26 |
| 3,288,302 | 11/1966 | Fitzpatrick | 108/143 |
| 3,877,714 | 4/1975 | Black | 280/34 R |
| 4,023,850 | 5/1977 | Tillery | 296/26 |

Primary Examiner—Robert R. Song
Attorney, Agent, or Firm—Frost & Jacobs

[57] ABSTRACT

A truck extension attachment for increasing the capacity of a truck bed to carry articles which project rearwardly out of the truck bed includes roller means mounted to the truck bed frame, a retractable frame passing through the roller means, a rear cross frame connected to the retractable frame and means for connecting the retractable frame to the rear cross frame. The roller means have one or more roller housings mounted to the truck bed frame with each roller housing having a pair of rollers vertically aligned within the roller housing. In a storage position, the retractable frame lies beneath the truck. By pulling the retractable frame rearwardly through the roller means, the retractable frame is placed in an operational position in which the retractable frame extends partially beyond the rear of the truck bed. The rear cross frame lies parallel to the rear of the truck to support articles projecting from the rear of the truck bed. In an alternative embodiment, an overhead extension attachment similar to the truck extension attachment is connected to the side frames of the truck to carry objects above the truck cab and beyond the rear of the truck.

2 Claims, 8 Drawing Figures

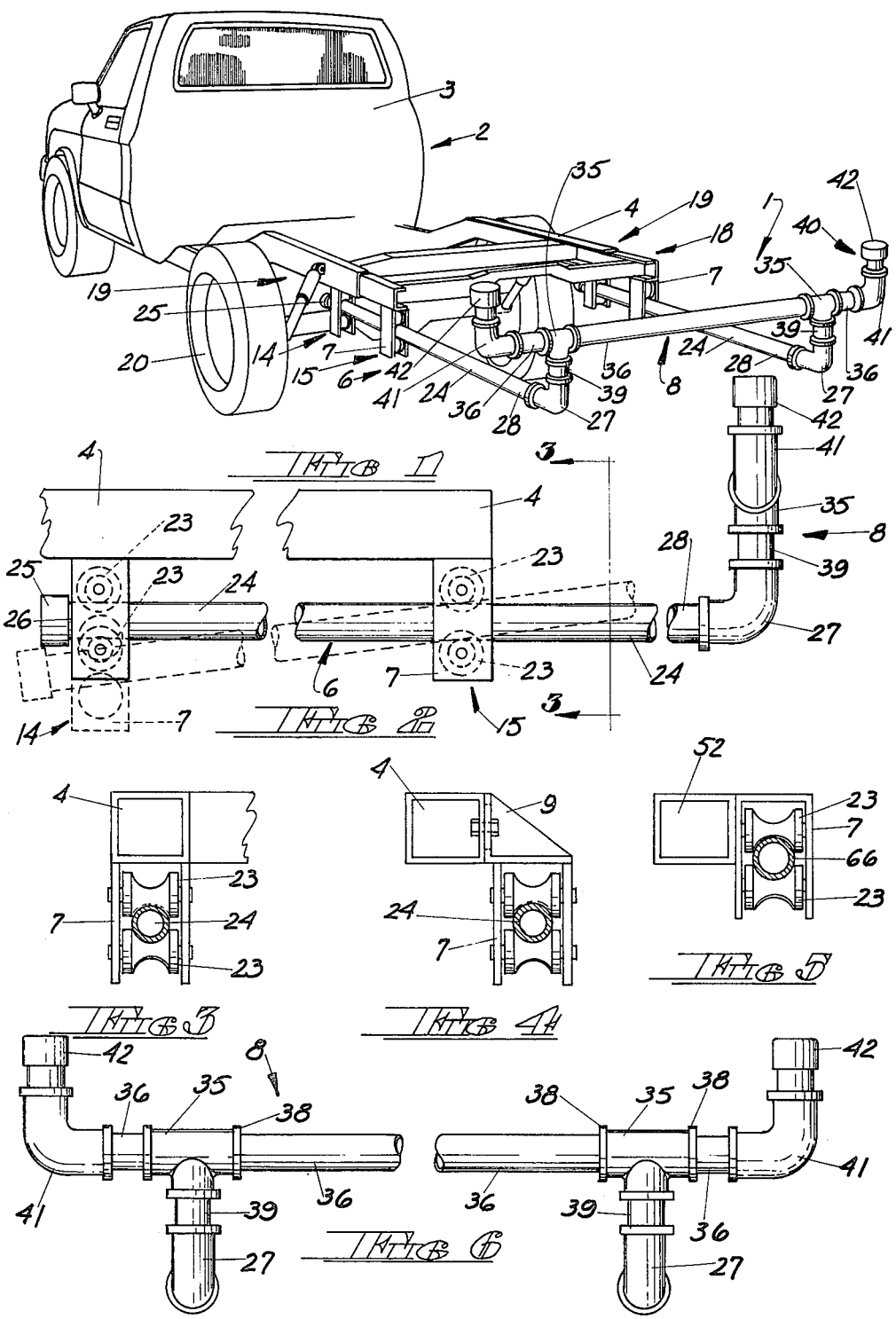

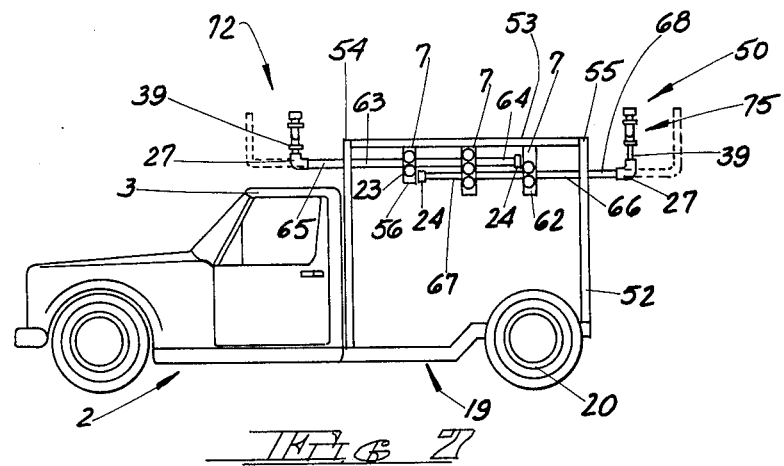
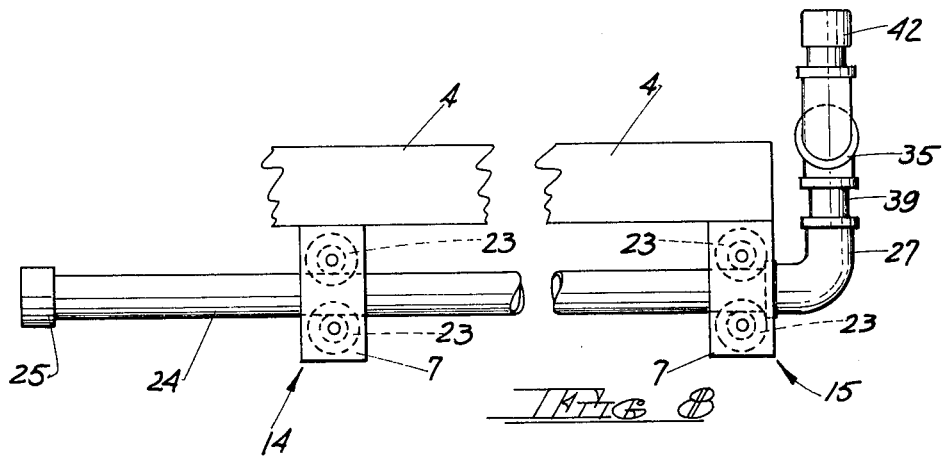

TRUCK BED EXTENSION ATTACHMENT

TECHNICAL FIELD

The present invention relates to extension devices for trucks, and more particularly to a truck extension attachment for enabling a truck bed to carry articles or objects which are too long to fit completely within the bed.

DESCRIPTION OF THE BACKGROUND ART

Numerous users and owners of trucks, especially pick-up trucks, often desire to carry with the truck objects which do not fit completely within the confines of the truck bed. The typical pick-up truck has a truck bed measuring 8 feet in length. When the article or object to be transported by the pick-up truck is less than 8 feet in length, generally, no problems are encountered in accommodating the article within the truck bed. However, it frequently occurs that objects exceeding 8 feet in length, such as ladders, gutters, or pipes, need to be transported by the pick-up truck. The desirability of being able to accommodate articles longer than the truck bed is especially acute when the pick-up truck is used by contractors, manufacturers, and artisans who need to transport various configurations of equipment and supplies to numerous locations. Essentially, there is a need for an extension device which can be used with a truck, especially a pick-up truck, so as to increase the capability of the truck to carry and transport articles which extend beyond the rear of the truck.

Preferably, the extension device should be universally adaptable to a number of different types of truck styles, designs, and types. When the device is attached to a truck which does not always carry oversize articles, then it is desirable to have the capability to retract the extension device within the truck body to prevent the unused extension device from impeding the maneuverability and handling of the truck. Additionally, the extension device should be safe, economical, and easy to install and use. Safety constraints mandate that the device prevents the overhanging article or object from inadvertently falling from the truck during transportation so as to cause a hazard to other drivers and vehicles on the highway. Economical considerations necessitate that the extension device be relatively inexpensive so that it is readily affordable to a wide range of individuals. Finally, the extension device should be easy and simple to install and use. The extension device should not require significant alterations to the pick-up truck so as to enable it to be quickly attached to the truck.

At times, the pick-up truck is used to carry objects along its upper and side frames so that the objects hang over the truck cab and extend rearwardly beyond the rear bumper of the truck. For example, the transportation of ladders or gutters pose a particular problem since they often exceed the length of the truck. Often, they are too long to carry in the truck bed even with the use of the extension device of the present invention. Rather, it is preferred to be able to carry these exceedingly long articles on the upper or side frame of the truck. The current transportation of these elongated objects creates numerous safety and practical problems since prior art devices fail to provide a means for supporting or securing the articles in place so that they are unobstructive and stabilized. Hence, it is desirable to have an overhead truck extension attachment which can be used with the upper or side frame of the truck so as to support articles hanging forwardly over the cab or rearwardly from the truck.

Prior art devices fail to provide an extension attachment for a pick-up truck which not only increases the carrying length of the truck, but which also satisfies the requirements of universal adaptability and retractability as well as providing safety, ease and economy in usage. Some prior art devices may satisfy one of the desired criteria, but lack the remaining requisite properties. No single prior art device satisfies the demands of the user or owner of the pick-up truck.

Generally, the prior art devices present to the user or owner of the pick-up truck four options with regard to extension devices. First, some types of extension support devices reposition the rear bumper of the truck in a plane horizontal to the truck bed. U.S. Pat. No. 2,468,579 in the name of Hans Vuori is exemplary of this type of device. These extension supports, however, require a special extensible bumper to be constructed as part of the pick-up truck body and hence, they are not universally adaptable to a large variety of truck bodies. Secondly, some models of extension supports use steel pipes which telescope into specially built tubular members. Examples of such telescoping members are demonstrated by U.S. Pat. No. 2,712,470 in the name of Albert S. Cardini and U.S. Pat. No. 2,729,499 in the name of Murnat O. Eggum. These types of device, however, are incapable of supporting a significant amount of weight. If the pipes are slightly bent out of shape from the weight of the article being carried, then the pipes will not readily telescope back into the tubular members. Thirdly, some models use a horizontal add-on panel which is attached by hinges and brackets to the tailgate of the truck. U.S. Pat. No. 4,023,850 in the name of James M. Tillery is exemplary of such devices. These extension panels, however, are not retractable into the main body of the truck when their use is not desired. Finally, some prior art devices provide a separate trailer which is hooked onto the rear of the truck and stored in the cargo space of the truck when it is not needed. An example of such a trailer attachment is demonstrated by U.S. Pat. No. 3,877,714 in the name of John O. Black. These attachments impede the normal usage of the truck when the use of the attachment is not desired since the attachment occupies the cargo space of the pick-up truck.

SUMMARY OF THE INVENTION

In the preferred embodiment, the truck extension attachment for enabling a truck bed to carry articles overhanging from the rear of the truck bed has a roller means mounted to a truck bed frame. A retractable frame passes through the roller means and is held in position by the roller means. The roller means includes one or more roller housings mounted to the truck bed frame. A pair of rollers are vertically aligned within each roller housing. A rear cross frame is perpendicularly connected across the retractable frame for supporting articles overhanging from the rear of the truck bed. A connecting means connects the retractable frame to the rear cross frame.

Specifically, the retractable frame includes two horizontally spaced parallel frame rods and a stopper positioned on the inner end of each frame rod. The rear cross frame has one or more cross rods joined together by one or more tee bars so as to form a continuous rear cross frame. The connecting means includes an elbow tube positioned on the outer end of each frame rod and a coupling bar joining the elbow tube to a tee bar. The rear cross frame can further include an upright retaining bar located at each outer end of the rear cross frame for preventing articles supported by the rear cross frame from being laterally displaced.

In an alternative embodiment, an overhead extension attachment for a truck having a truck bed and a truck cab includes a side frame extending vertically upward from each longitudinal side of the truck bed. The side frames are oriented parallel to each other with the top of the side frame being above the truck cab. Roller means are mounted to the side frames of the truck. The roller means have one or more roller housings attached to the side frame of the truck. Each roller housing has two or more rollers vertically aligned within the roller housing. One or more retractable frames pass through the roller means and are held in position by the roller means on the side frame. An upper cross frame is perpendicularly connected across the retractable frame for supporting articles overhanging above the truck bed or projecting rearwardly from the truck. Connection means, including an elbow tube and coupling bar, are provided for connecting the retractable frame to the upper cross frame.

The present invention obviates the disadvantages inherent in prior art extension devices by providing a universally adaptable truck extension attachment which can easily retract into the truck body when its use is not desired. The present invention, in an operational position, presents a retractable frame extending beyond the rear of the truck to provide a support for articles or objects overhanging rewardly from the truck bed. When the extension attachment is not needed, the present invention retracts into a storage position by orienting the retractable frame completely bneath the truck bed. The present invention can bear great weight without being bent out of shape even when heavy loads are placed on the extension attachment due to the sturdy construction of the present invention. The design of the extension attachment of the present invention allows it to retain its ability to retract into the storage position when its use is not required. In the storage position beneath the underside of the truck bed frame, the present invention does not occupy valuable cargo space in the truck bed and hence, it does not interfere with the normal usage of the truck.

The present invention provides to the truck owner a safe, easy, economical extension attachment. To convert the extension attachment from the storage position to the operational positional, the user merely pulls the extension attachment rearwardly from the truck to provide an extension of the desired length. The retractable frame slides on the rollers within the roller housing to the desired extension length in which it is held tightly in position by the rollers gripping the frame. This engagement between the rollers and frame provides a safety feature since the extension attachment cannot alter its position or become disengaged from the truck while the truck is in motion. From an economical standpoint, the present invention is relatively inexpensive to use and assemble. The use of the present invention eliminates the noisy rattle which is generally associated with the prior art devices which rely on ball bearings to move the extensions between various positions. In contrast, the present invention uses rubber rollers to hold the extension attachment in position and hence, it provides a quiet ride when the truck with the extension attachment is in motion.

While for purposes of the exemplary embodiment, the present invention is shown as a truck extension attachment for pick-up trucks, it will be understood, however, by one skilled in the art that the extension attachment can be used to extend various other horizontal supports such as shelvings and cabinets.

DESCRIPTION OF THE DRAWINGS

FIG. 1 is a rear perspective view of the truck extension attachment in an operational position on a pick-up truck.

FIG. 2 is a partial side cross sectional view of the truck extension attachment in an operational position.

FIG. 3 is a rear view of a roller housing taken along line 3—3 in FIG. 2 attached to a truck bed frame.

FIG. 4 is a rear view of a roller housing of the truck extension attachment attached to a truck bed frame using an L-bracket.

FIG. 5 is a roller housing of the overhead extension attachment attached to the side frame of the truck.

FIG. 6 is a fragmentary rear view of the truck extension attachment.

FIG. 7 is a side perspective view of the overhead extension attachment shown both in the storage and operational positions on a truck.

FIG. 8 is a fragmentary side view of the truck extension attachment in a storage position.

DETAILED DESCRIPTION OF THE INVENTION

Referring now to FIGS. 1 and 2, an extension attachment 1 of the present invention is shown in use with a conventional pick-up truck 2 having a truck cab 3 and truck bed frame 4. The extension attachment 1 includes both a retractable frame 6 passing through one or more roller housings 7 and a rear cross frame 8 capable of supporting articles (not shown) overhanging from the truck bed (not shown) located on top of the truck bed frame 4.

One or more roller housings 7 are mounted to the truck bed frame 4. The roller housings 7 are preferably manufactured from galvanized steel and they are attached to the truck bed frame 4 by either conventional welding techniques or by using nuts and bolts. The roller housing 7 is mounted either directly to the truck bed frame 4 as shown in FIG. 3 or first to an L-bracket 9 which is then attached to the truck bed frame 4 as shown in FIG. 4. The roller housing 7 is generally attached directly to the truck bed frame 4 as shown in FIG. 3 when there are no obstructions on the underside of the truck 2 blocking the movement of the retractable frame 3 between the storage and operational positions. To avoid obstructions, as shown in FIG. 4, an L-bracket 9 can be attached to the truck bed frame 4 so as to allow the roller housing 7 to be positioned on the underside of the truck 2 to avoid the underlying obstructions.

Preferably, four roller housings are used in the present invention. The four roller housings are arranged in two units, an interior housing unit 14 and an exterior housing unit 15. The interior housing unit 14 has two roller housings 7 with each roller housing 7 being mounted on opposite sides the truck bed frame 4. It is preferred that the two roller housings 7 of the interior housing unit 14 are positioned equidistantly from a center line passing through the length of the truck. The exterior housing unit 15 similarly, has two roller housings 7 each of which are mounted on opposite sides of the truck bed frame 4. The exterior housing unit 15 is positioned on the truck bed frame 4 between the interior housing unit 14 and the rear 18 of the truck 2. The roller housings 7 of the interior housing unit 14 and the exterior housing unit 15 which are on the same side of the truck bed frame 4 are aligned so as to position the retractable frame 6 parallel to the longitudinal sides 19 of the truck 2.

As shown in FIG. 2, the roller housings 7 of the interior housing unit 14 can be mounted to the truck bed frame 4 so that they hang lower from the truck bed frame 4 than the roller housings 7 of the exterior housing unit 15. Such a positioning allows the retractable frame 6 to be angled upwardly towards the rear 18 of the truck 2 so that the rear cross frame 8 will be higher relative to the ground than when the retractable frame 6 is horizontal. By angling the retractable frame 6, the rear cross frame 8 can be positioned level with the truck bed frame when the extension attachment 1 is in the operational position and hidden below the bumper of the truck when it is in the storage position.

Preferably, the roller housings 7 of the interior housing unit 14 are located near to the wheels 20 of the truck 2. A positioning of the interior housing unit 14 on the truck bed approximately 36 to 54 inches from the rear 18 of the truck 2 has provided the requisite stability to support the retractable frame 6. The exterior housing unit 15 is positioned on the truck bed 4 near to the rear 18. A distance of 1 to 12 inches from the exterior housing unit 15 to the rear 18 has provided the necessary support to the retractable frame 6 in the operational position since such a distance allows the exterior housing unit 15 to be located near to the center of gravity of the retractable frame 6. Additionally, by altering the longitudinal positions of the interior housing unit 14 towards either the truck cab 3 or the rear 18, the distance the retractable frame 6 protrudes rearwardly from the truck 2 will be decreased or increased respectively.

Within each roller housing 7, a pair of rollers 23 is positioned. The pair of rollers 23 are vertically aligned within each roller housing 7. The rollers 23 are separated by a distance which corresponds to the diameter of the retractable frame 6. The rollers 23 are contoured to conform to the shape of the retractable frame 6 passing between the rollers. Since the retractable frame 6 is circular in shape, each roller 23, as shown in FIG. 3, is concave to accommodate the retractable frame 6. The vertical alignment of the rollers 23 allows the retractable frame 6 to pass through the rollers 23 into a storage position under the truck. The rollers 23 can be adjusted within the roller housings 7 to vary the vertical distance separating the rollers 23 so as to accommodate different sizes of retractable frames 6 without the need of installing new roller housings 7. To set the vertical distance between the rollers 23, the desired size of the retractable frame 6 is inserted into the pair of rollers 23 within the roller housing 7 and the rollers 23 are set tight onto the retractable frame 6.

Preferably, the rollers 23 are composed of rubber so as to allow the rollers 23 to engage frictionally the retractable frame 6. A frictional engagement between the rollers 23 and the retractable frame 6 holds the retractable frame 6 in either the operational or storage positions. By the rollers 23 tightly gripping the retractable frame 6, the undesired movement of retractable frame 6 during use of the truck 2 is prevented. However, the conversion of the extension frame 1 into the storage position is easily allowed to occur when a sufficient inward force is placed on the retractable frame 6 by the user.

The retractable frame 6 has one or more frame rods 24, with a stopper 25 positioned on the inner end 26 of each frame rod 24. The frame rods are held generally either in a horizontal position relative to the truck bed frame 4 or at an upward angle as shown in FIG. 2. Preferably, the retractable frame 6 has two horizontally spaced parallel frame rods 24 each of which pass through a roller housing 7 within the exterior housing unit 15 and a roller housing 7 within the interior housing unit 14. If the interior housing unit 14 is mounted to the truck bed frame 4 near to the wheels 20, then the retractable frame 6 contains two parallel frame rods 24 separated by a distance which is slightly less than the width of the truck 2. When more than two frame rods 24 compose the retractable frame 6, then the frame rods 24 are spaced relative to each other so as to provide a stable retractable frame 6. By positioning the frame rods 24 near to the longitudinal sides 19 of the truck 2, the retractable frame 6 is capable of easily maintaining its position when significant weight is placed on it during use. In contrast, if the frame rod 24 are placed near to the center line of the truck 2, the retractable frame 6 will more readily become unstable as significant weight is placed upon it. It is believed, that when the frame rods 24 are widely separated, the weight of the carried load has a greater surface area over which it is distributed.

The stopper 25 is positioned on the inner end 26 of each frame rod 24. The stopper 25 is of a slightly larger diameter than the frame rod 24 to which it is attached and hence, its diameter is likewise greater than the vertical distance separating the rollers 23 within the roller housings 7 of the interior housing unit 14. The stopper 25 prevents the frame rods 24 from coming completely out of the roller housing 7 of the interior housing unit 14 when the retractable frame 6 is extended outwardly from the rear 18 of the truck. If the retractable frame 6 is fully extended outwardly in its operational position, then the stopper 25 will abut against the roller housing 7 of the interior housing unit 14 to inhibit the further passage of the frame rods 24 through the roller 23. The stopper 25 can be made of the same material, such as galvanized steel, as the frame rods 24, and it can be attached to the frame rod 24 by numerous connection techniques such as welding and screwing.

The rear cross frame 8, as shown in FIG. 6, includes one or more cross rods 36 joined together by one or more tee bars 35. Preferably, three cross rods 36 are joined together by two tee bars 35 with each tee bar 35 joining together two cross bars 36. Each end 38 of the top portion of the tee bar 35 is attached to a cross rod 36. The retractable frame 6 is connected to the rear cross frame 8 by an elbow tube 27 and a coupling bar 39. The elbow tube 27 is on an outer end 28 of the frame rod 24. The coupling bar extends vertically upward from the elbow tube 27 and the coupling bar 39 joins the end of the elbow tube 27 not attached to the frame rod 24 to the bottom portion of the tee bar 35. Hence, the rear cross frame 8 is connected to the frame rods 24 of the retractable frame 6 by the elbow tube 27 joined to the coupling bar 39 which is thereby attached to the tee bar 35. The elbow tubes 27 are attached to the frame rod 24 by conventional techniques such as welding or screwing. The elbow tubes 27 and coupling bars 39 can be of a kind which are typically employed in the plumbing or heating fields. The size of the elbow tubes 27 and coupling bar 39 are selected depending upon the desired position of the rear cross frame 8 relating to the truck 2.

The rear cross frame 8 further includes an upright retaining bar 40 located at each outer end 41 of the rear cross frame 8. The upright retaining bar 40 prevents articles supported by the rear cross frame 8 from being laterally displaced from the rear cross frame 8 especially when the truck 2 is in motion. The upright retaining bar 40 includes an elbow tube 41 and a cap 42. The elbow tube 41 and cap 42 are similar to the elbow tube 27 and stopper 25.

The upright retaining bar 40, as well as the cross rods 36, the tee bars 35, the elbow tubes 27, the frame rods 24, and the coupling bars 39 can be made of galvanized steel. It has been found that using galvanized steel pipe of approximately one and one-half inch to three-inch diameter has provided the requisite strength, support and stability for the extension attachment 1. However, other materials such as strong plastic or aluminum could be satisfactorily used. Similarly, other diameters can be utilized depending upon the prospective use of the extension attachment 1.

Additionally, it is often desirable to carry elongated objects above the truck cab 3 of the truck 2. Typically, when long articles such as gutters, pipes, and ladders are transported by the upper structure of the truck 2, the article overhangs onto the truck cab 3 and beyond the rear 18 of the truck 2. An overhead extension attachment 50 of the present invention, as shown in FIG. 7, is provided to enable a truck 2 having a truck bed frame 4 and side frames 52 to carry objects on the top portion of the truck 2. The overhead extension attachment 50 has a side frame 52 extending vertically upward from each longitudinal side 19 of the truck bed frame 4. The side frame 52 are oriented parallel to each other. The height of the side frames 52 are sufficient so that the top 53 of the side frames 52 extend above the top portion of the truck cab 3. The side frames 52 have a front edge 54 and a rear edge 55. A front upper housing unit 56 has two roller housings 7. Each roller housing 7 is attached to one of the side frames 52 so that they are spatially located opposite each other on opposing longitudinal sides 19 of the truck 2. Each roller housing 7 of the front upper housing unit 56 is positioned equidistantly from the front edge 54 of the side frame 52 to which it is attached.

A rear upper housing unit 62, similarly, has two roller housings 7 each of which is attached to the side frame 52. The roller housings 7 of the rear upper housing unit 62 are spatially located opposite each other with one roller housing 7 being attached to each side frame 52. Each roller housing 7 of the rear upper housing unit 62 is equidistantly positioned from the rear edge 55 of the side frame 52 to which it is attached. The rear upper housing unit 62 is spatially oriented on the side frame between the upper front housing unit 56 and the rear edge 55 of the side frame 52. A positioning of the front upper housing unit 56 on the side frame 52 approximately 1 to 3 feet from the front edge 54 has been found to provide the requisite strength and support for the overhead extension attachment 50. Similarly, locating the rear upper housing unit 62 between 1 and 3 feet from the rear edge 55 of the side frames 52 likewise yields the necessary support for the overhead extension attachment 50. FIG. 5 shows the attachment of the roller housing 7 of either the front 56 or the rear 62 upper housing units to the side frame 52.

A middle upper housing unit 57 having two roller housings 7 are attached to the side frame 52 between the front upper housing unit 56 and the rear upper housing unit 62. The roller housing units 7 of the middle upper housing unit 57 are spatially located opposite each other with one roller housing 7 being attached to each side frame 52. A positioning of the middle upper housing unit 52 equidistantly between the front edge 54 and the rear edge 55 of the side frames 52 has been found to provide the requisite stability and support to the overhead extension attachment 50.

Within each roller housing 7 of both the front 56 and the rear 62 upper housing units, two rollers 23 are vertically aligned. The rollers are similar to those used in the extension attachment 1. Within each roller housing 7 of the middle upper housing unit 57, three rollers 23 are vertically aligned to allow for the passage of both a front rod 63 and a rear rod 66 through the roller housings 7 of the middle upper housing unit 57. The rollers 23 are located within the roller housings 7 of the front 56, middle 57 and rear 62 upper housing units to allow for the passage of the front rods 63 and the rear rods 66.

Two front rods 63 each having an inner end 64 and an outer end 65 pass through a pair of rollers 23 within the roller housing 7 in the front upper housing unit 56 and through a pair of rollers 23 within a roller housing 7 in the middle upper housing unit 57. Each front rod 63 has a stopper 24 positioned on the inner end 64 for preventing the front rod 63 from passing completely through the roller housing 7 of the middle upper housing unit 57. Two rear rods 66 each having an inner end 67 and an outer end 68 pass through a pair of rollers 23 within the roller housings 7 in the rear upper housing unit 62 and then through a pair of rollers 23 within the roller housings 7 of the middle upper housing unit 57. As with the front rod 63, the rear rods 66 likewise have a stopper 24 positioned on the inner end 67 for preventing the rear rod 66 from passing completely through the roller housing 7 of the middle upper housing unit 57. Both the rear rods 66 and the front rods 63 as well as the side frame 52 can be made of galvanized steel pipe. Generally, steel pipe having a diameter of three-quarter inch to 3 inches has provided the requisite strength and stability.

An upper front cross frame 72 is attached perpendicularly across the pair of front rods 63. In an operational position, the upper front cross frame 72 extends above the truck cab 3 to support the articles overhanging above the truck cab 3. The upper cross frame 72 can be directly welded to the front rods 63 or it can be attached to the front rod 63 by an elbow tube 27 and a coupling bar 39 in the same manner that retractable frame 6 is connected to the rear cross frame 8 of the extension attachment 1.

Similarly, an upper rear cross frame 74 is attached perpendicularly across the pair of rear rods 66. Similar to the upper front cross frame 72, the upper rear cross frame 74 is attached to the rear rods 66 by an elbow tube 27 and a coupling bar 39. At the outer ends of both the upper front cross frame 72 and the upper rear cross frame 74 there is located a retaining bar 74 similar in construction to the upright retaining bar 40 attached to the outer ends of the rear cross frame 8. In an operational position, the upper rear cross frame 74 extends beyond the rear 18 of the truck 2 to support articles, such as gutters, or ladders, projecting rearwardly from the top portion of the side frames 52. In the operational position, the truck 2 can carry elongated articles on the top 51 of the side frames 52 as well as in the truck bed.

This extra carrying capacity, which can be achieved without hindering the safety and maneuverability of the truck 2, allows the truck 2 to be used in various transportation needs.

Both the extension attachment 1 and the overhead extension attachment 50 can be used with various types and models of trucks. Although the present invention is shown utilized with a pick-up truck, it should be appreciated by one skilled in the art that the present invention can be used with various other types of trucks. Likewise, truck extension attachment 1 can be used with various configurations of truck beds including flat beds, standardized beds, and step beds. The extension attachment 1 and overhead extension attachment 50 can either be used singly or together on a truck 2 depending upon the particular needs.

What is claimed is:

1. A truck extension attachment for enabling a truck having a truck bed frame to carry articles projecting from the rear of the truck comprises:
   (a) an interior housing unit having two roller housings, each roller housing of the interior housing unit being mounted to the truck bed frame, each roller housing of the interior housing unit being positioned on opposite sides of a center line passing through the length of the truck;
   (b) an exterior housing unit having two roller housings, the roller housings of the exterior housing unit being positioned on opposite sides of the center line of the truck, the exterior housing unit being positioned on the truck bed frame between the interior housing unit and the rear of the truck, each roller housing of the exterior housing unit being the same distance from the center line as the roller housing of the interior housing unit on the same side of the center line;
   (c) a pair of vertically aligned rollers positioned within each roller housing of both the interior and exterior housing units, the rollers being composed of rubber, each roller being concave in shape, the rollers within each roller housing being vertically separated by a distance corresponding to the diameter of the retractable frame;
   (d) two horizontally spaced parallel frame rods retractably positioned within the roller housings of both the interior and exterior housing units, each frame rod passing through a roller housing of the exterior housing unit and a roller housing of the interior housing unit, the frame rods being frictionally engaged by the rollers within each roller housing for preventing the undesired movement of the frame rods, each frame rod having an inner and outer end, in an operational position, the frame rods partially extend beyond the rear of the truck, in a storage position, the frame rods lie completely beneath the truck;
   (e) a stopper positioned on the inner end of each frame rod for preventing the frame rod from coming completely out of the roller housing of the interior housing unit when the frame rods are in the operational position;
   (f) an elbow tube attached to the outer end of each frame rod;
   (g) a coupling bar joined to the end of the elbow tube not attached to the frame rod; and
   (h) a rear cross frame having three rear cross rods joined together by two tee bars to form a continuous rear cross frame, the bottom portion of each tee bar joined to a coupling bar for connecting the rear cross frame to the frame rods.

2. A truck extension attachment as described in claim 1, further comprising an upright retaining bar at each end of the rear cross frame for preventing the articles supported by the rear cross frame from being laterally displaced.

* * * * *